(12) United States Patent
Oonishi

(10) Patent No.: US 11,402,819 B2
(45) Date of Patent: Aug. 2, 2022

(54) SCREEN CREATION DEVICE AND SCREEN CREATION SYSTEM

(71) Applicant: FANUC CORPORATION, Yamanashi (JP)

(72) Inventor: Nobuhito Oonishi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 240 days.

(21) Appl. No.: 16/787,196

(22) Filed: Feb. 11, 2020

(65) Prior Publication Data

US 2020/0272126 A1 Aug. 27, 2020

(30) Foreign Application Priority Data

Feb. 26, 2019 (JP) .............................. JP2019-032801

(51) Int. Cl.
*G06F 3/04847* (2022.01)
*G06F 9/451* (2018.01)
*G05B 19/4097* (2006.01)

(52) U.S. Cl.
CPC ..... *G05B 19/4097* (2013.01); *G06F 3/04847* (2013.01); *G06F 9/451* (2018.02); *G05B 2219/33127* (2013.01)

(58) Field of Classification Search
None
See application file for complete search history.

(56) References Cited

U.S. PATENT DOCUMENTS

2007/0276652 A1\* 11/2007 Oki ..................... G06F 40/263
704/9
2013/0139088 A1\* 5/2013 King .................. G05B 19/4093
715/771
2016/0085235 A1 3/2016 Kamijo
(Continued)

FOREIGN PATENT DOCUMENTS

EP 0640900 A1 \* 3/1995 ........ G05B 19/40932
JP H0720918 A \* 1/1995 ......... G05B 19/4093
(Continued)

OTHER PUBLICATIONS

Final Office Action dated Dec. 7, 2021 in U.S. Appl. No. 16/597,150.
Office Action dated Mar. 24, 2021 in U.S. Appl. No. 16/597,150.

*Primary Examiner* — Daniel Rodriguez
*Assistant Examiner* — Gabriel Mercado
(74) *Attorney, Agent, or Firm* — Wenderoth, Lind & Ponack, L.L.P.

(57) ABSTRACT

A screen creation device includes a unit that displays an edit screen including a log data display area, a related parts display area, and a guidance screen display area in a display unit; a unit that displays a set of log data of a series of machine tool operations in the log data display area; a unit that selects log data from the set of the log data displayed in the log data display area in accordance with an instruction of a user; a unit that acquires a related part related to an operation related to the selected log data from a storage unit and displays the related part in the related parts display area; and a unit that arranges the related part displayed in the related parts display area on a guidance screen being created in the guidance screen display area in accordance with an instruction of the user.

7 Claims, 15 Drawing Sheets

(56) References Cited

U.S. PATENT DOCUMENTS

| | | | |
|---|---|---|---|
| 2016/0320772 A1 | 11/2016 | Ono et al. | |
| 2017/0123385 A1 | 5/2017 | Iijima | |
| 2017/0168698 A1* | 6/2017 | Sakamoto | G05B 19/409 |
| 2017/0220017 A1* | 8/2017 | Nishi | G05B 19/0426 |
| 2017/0357231 A1 | 12/2017 | Kurohara | |
| 2018/0032404 A1* | 2/2018 | Komatsu | G06F 11/1469 |

FOREIGN PATENT DOCUMENTS

| | | |
|---|---|---|
| JP | H08-328829 A | 12/1996 |
| JP | 2003-202910 A | 7/2003 |
| JP | 4105303 | 6/2008 |
| JP | 2018-018429 A | 2/2018 |

\* cited by examiner

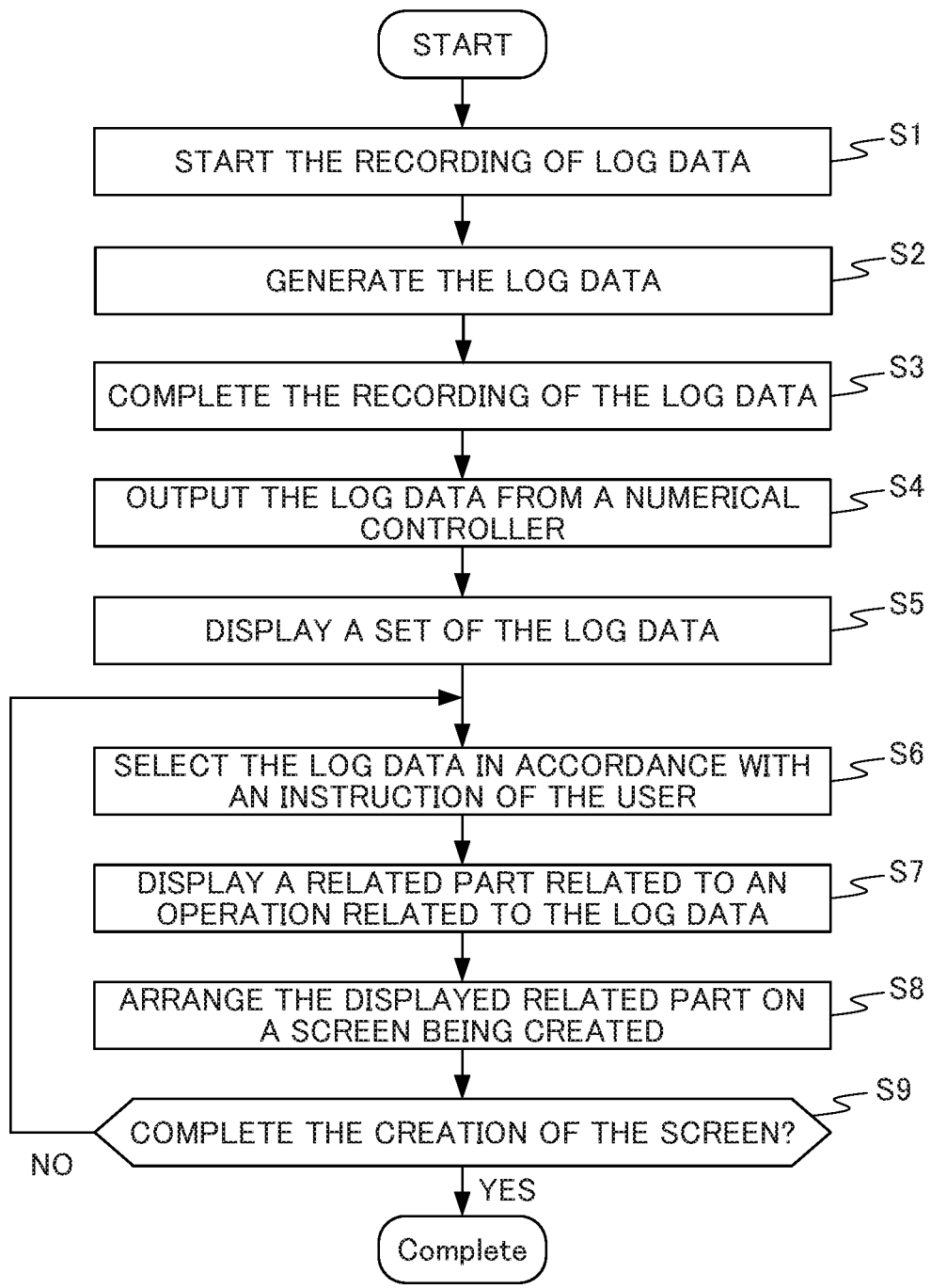

FIG. 6A
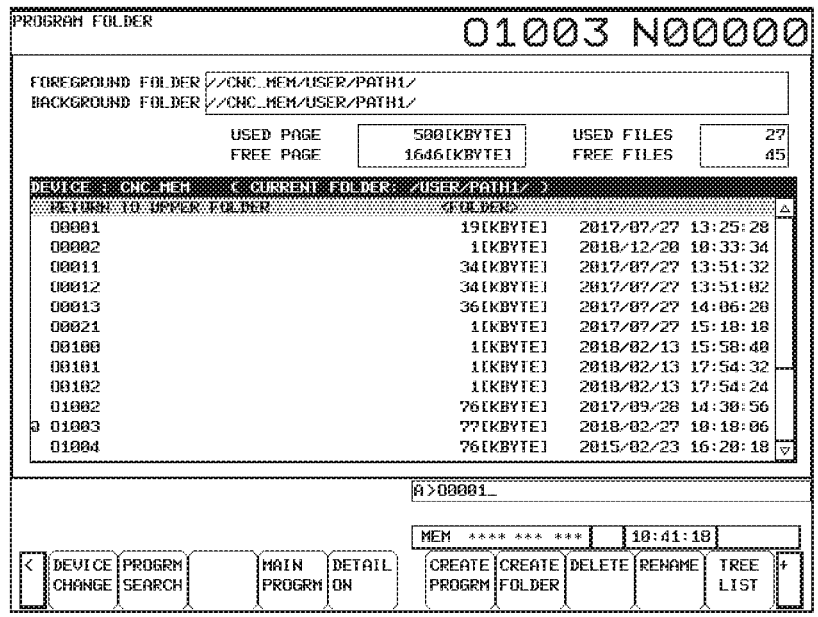
SCREEN ID: No.0100H
FIG. 6B
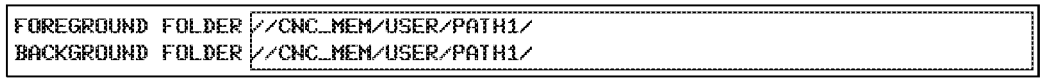
SCREEN PART ID: 0001H
FIG. 6C
| USED PAGE | 500[KBYTE] |
| FREE PAGE | 1646[KBYTE] |
SCREEN PART ID: 0002H
FIG. 6D
| USED FILES | 27 |
| FREE FILES | 45 |
SCREEN PART ID: 0003H

FIG. 6E

| DEVICE : CNC_MEM | CURRENT FOLDER : /USER/PATH1/ | |
|---|---|---|
| RETURN TO UPPER FOLDER | <FOLDER> | |
| O0001 | 19[KBYTE] | 2017/07/27 13:25:28 |
| O0002 | 1[KBYTE] | 2018/12/20 10:33:34 |
| O0011 | 34[KBYTE] | 2017/07/27 13:51:32 |
| O0012 | 34[KBYTE] | 2017/07/27 13:51:02 |
| O0013 | 36[KBYTE] | 2017/07/27 14:06:28 |
| O0021 | 1[KBYTE] | 2017/07/27 15:18:18 |
| O0100 | 1[KBYTE] | 2018/02/13 15:58:40 |
| O0101 | 1[KBYTE] | 2018/02/13 17:54:32 |
| O0102 | 1[KBYTE] | 2018/02/13 17:54:24 |
| O1002 | 76[KBYTE] | 2017/09/28 14:30:56 |
| O1003 | 77[KBYTE] | 2018/02/27 10:10:06 |
| O1004 | 76[KBYTE] | 2015/02/23 16:20:18 |

SCREEN PART ID : 0004H

SCREEN PART ID : 0005H

FIG. 6G

`MEM  **  *  ***`

SCREEN PART ID : 0006H

SCREEN PART ID : 0007H

SCREEN ID : No.0200H

SCREEN PART ID : 0008H

SCREEN PART ID : 0009H

FIG. 7D
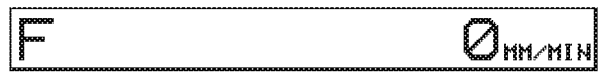
SCREEN PART ID:000AH
FIG. 7E
```
PARTS COUNT                  209
RUN TIME                2H58M 6S
CYCLE TIME              0H 0M 0S
```
SCREEN PART ID:000BH
FIG. 7F
```
       WORK COORDINATES
(G54)
NO.      DATA    NO.      DATA
000  X   0.000   002  X   0.000
EXT  Y   0.000   G55  Y   0.000
     Z   0.000        Z   0.000
001  X   0.000   003  X   0.000
G54  Y   0.000   G56  Y   0.000
     Z   0.000        Z   0.000
```
SCREEN PART ID:000CH
FIG. 7G
SCREEN PART ID:0005H

FIG. 7H

| MEM **** *** *** |

SCREEN PART ID:0006H

FIG. 7I

| 11:01:49 |

SCREEN PART ID:0007H

SOFT KEY ID:0030H

SOFT KEY ID:0040H

FIG. 9

Screen No.0100H
Key in buffa "O0001"
Soft key No.0030H
Soft key No.0040H
G0007.2 ON
G0007.2 OFF
Screen No.0200H
Screen No.0100H
Key in buffa "O0002"
Soft key No.0030H
Soft key No.0040H
G0007.2 ON
G0007.2 OFF
Screen No.0200H

SCREEN CREATION DEVICE AND SCREEN CREATION SYSTEM

This application is based on and claims the benefit of priority from Japanese Patent Application No. 2019-032801, filed on 26 Feb. 2019, the content of which is incorporated herein by reference.

BACKGROUND OF THE INVENTION

Field of the Invention

The present invention relates to a screen creation device and a screen creation system.

Related Art

There are many types of machine tools to which a numerical controller is applied, and the setup method and the machining method at the time of using the machine tool differ depending on the type of the machine tool and the machining target. Therefore, the default operation screen provided by the numerical controller does not necessarily have an optimal constitution for each machine tool to which the numerical controller is applied.

The numerical controller provides screen customization functions, which may be used by machine tool manufacturers or engineers to create their own screens. Some customization functions can be created with a simple GUI (Graphical User Interface) operation.

For example, a technique is known in which a user selects areas and items from display areas and display items that are preset by a machine tool manufacturer with a GUI operation in a display device of an NC machine tool in order to easily create a custom screen so as to meet a screen image drawn by the user (for example, see Patent Document 1).

Patent Document 1: Japanese Patent No. 4105303

SUMMARY OF THE INVENTION

Screens created with the numerical controller are, for example, guidance screens for setup work and machining work. When creating these guidance screens, it is desirable to devise ways such as aggregating necessary information into one screen and arranging buttons according to a procedure for setup work or machining work so that the operation of an operator becomes as simple as possible and operator's errors do not occur.

For example, when creating a guidance screen, if there is a procedure manual for setup work or machining work, the screen is created while referring to the procedure manual. However, since there is no association between the procedure manual and a screen creation environment, it has been difficult to create the screen efficiently. If there is no work procedure manual, when creating a screen, it is necessary to start creating a work procedure manual by checking workflow, and the processing related to screen creation is not easy.

An object of the present invention is to provide a screen creation device and a screen creation system capable of creating guidance screens for setup work and machining work using a machine tool with simple processing.

An aspect of the present disclosure is a screen creation device that creates a guidance screen for an operation related to work by a machine tool to be displayed on a display device of a numerical controller. The screen creation device includes a display unit, a storage unit, and a control unit. The storage unit stores a predefined related part related to the operation to be arranged on the guidance screen. The control unit includes: an edit screen display unit that displays an edit screen including a log data display area, a related parts display area, and a guidance screen display area in the display unit; a log data display unit that displays a set of log data of a series of operations related to work by the machine tool to be input from the numerical controller in the log data display area; a log data selection unit that selects log data from the set of the log data displayed in the log data display area in accordance with an instruction of a user; a related parts display unit that acquires the related part related to the operation related to the selected log data from the storage unit and displays the related part in the related parts display area; and a related parts arrangement unit that arranges the related part displayed in the related parts display area on the guidance screen being created in the guidance screen display area in accordance with an instruction of the user.

According to the aspect, it is possible to create guidance screens for setup work and machining work using a machine tool with simple processing.

BRIEF DESCRIPTION OF THE DRAWINGS

FIG. 5 is a flowchart showing the behavior of the screen creation system according to the embodiment;

FIG. 6A shows an example program folder screen in an Example;

FIG. 6B shows an example related part included in the program folder screen in the Example;

FIG. 6C shows an example related part included in the program folder screen in the Example;

FIG. 6D shows an example related part included in the program folder screen in the Example;

FIG. 6E shows an example related part included in the program folder screen in the Example;

FIG. 6F shows an example related part included in the program folder screen in the Example;

FIG. 6G shows an example related part included in the program folder screen in the Example;

FIG. 6H shows an example related part included in the program folder screen in the Example;

FIG. 7D shows an example related part included in the workpiece offset screen in the Example;

FIG. 7E shows an example related part included in the workpiece offset screen in the Example;

FIG. 7F shows an example related part included in the workpiece offset screen in the Example;

FIG. 7G shows an example related part included in the workpiece offset screen in the Example;

FIG. 7H shows an example related part included in the workpiece offset screen in the Example;

FIG. 7I shows an example related part included in the workpiece offset screen in the Example;

FIG. 9 shows example log data in the Example;

DETAILED DESCRIPTION OF THE INVENTION

First Embodiment

Figure 1:
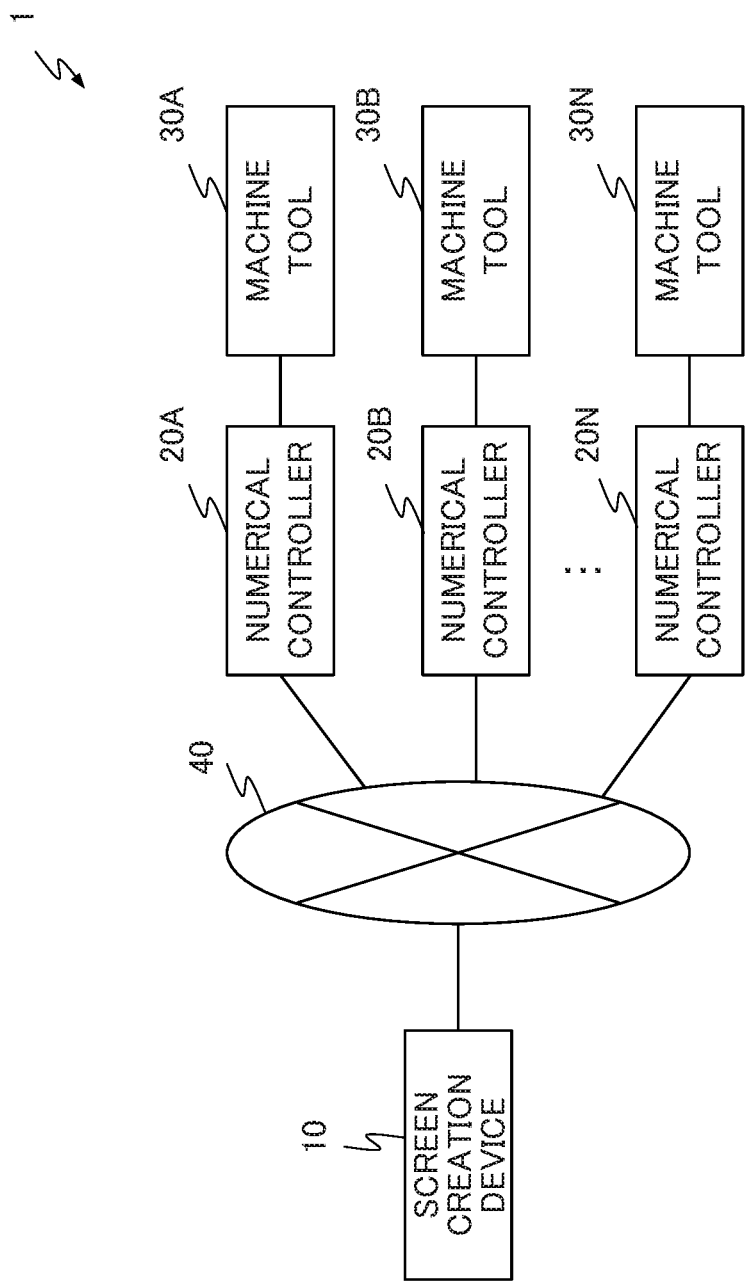
FIG. 1 is a block diagram showing the entire constitution of a screen creation system according to an embodiment.
Figure 2:
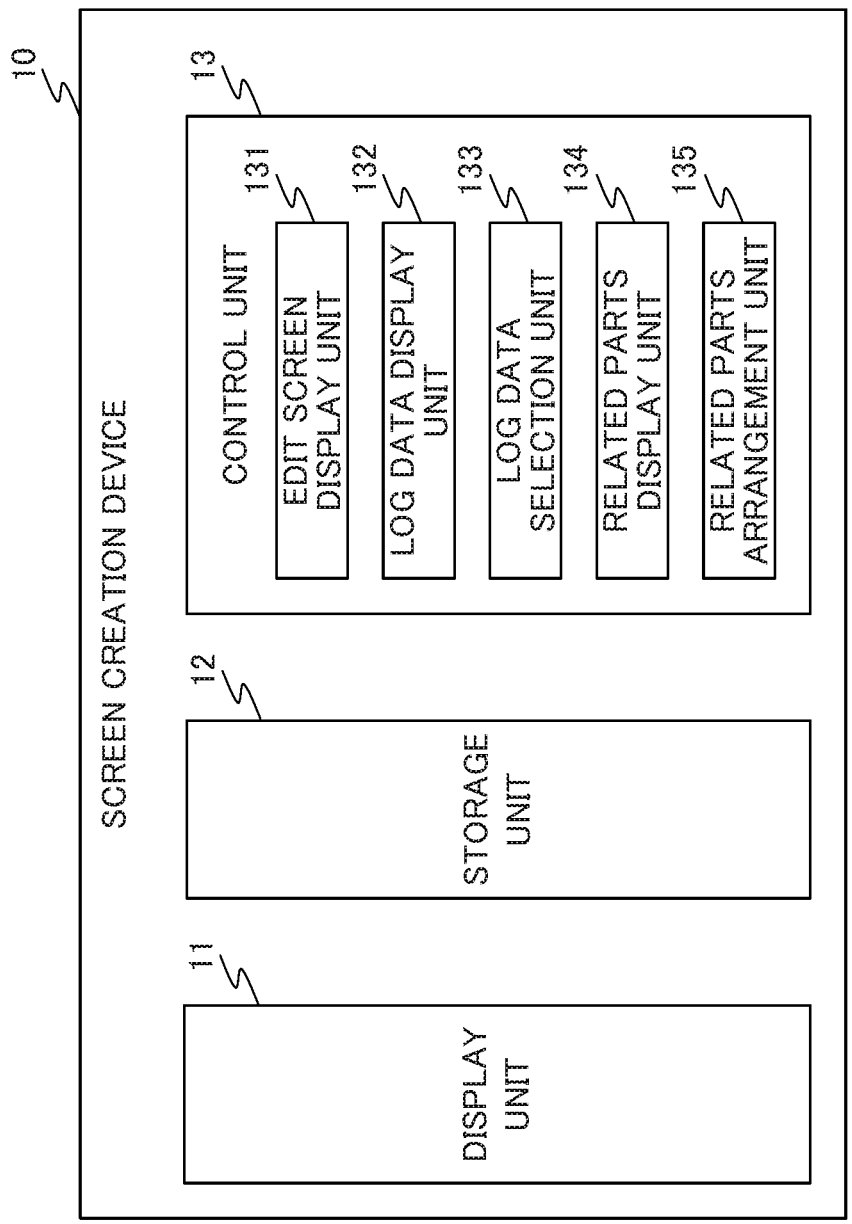
FIG. 2 is a functional block diagram of a screen creation device according to the embodiment.
Figure 3:
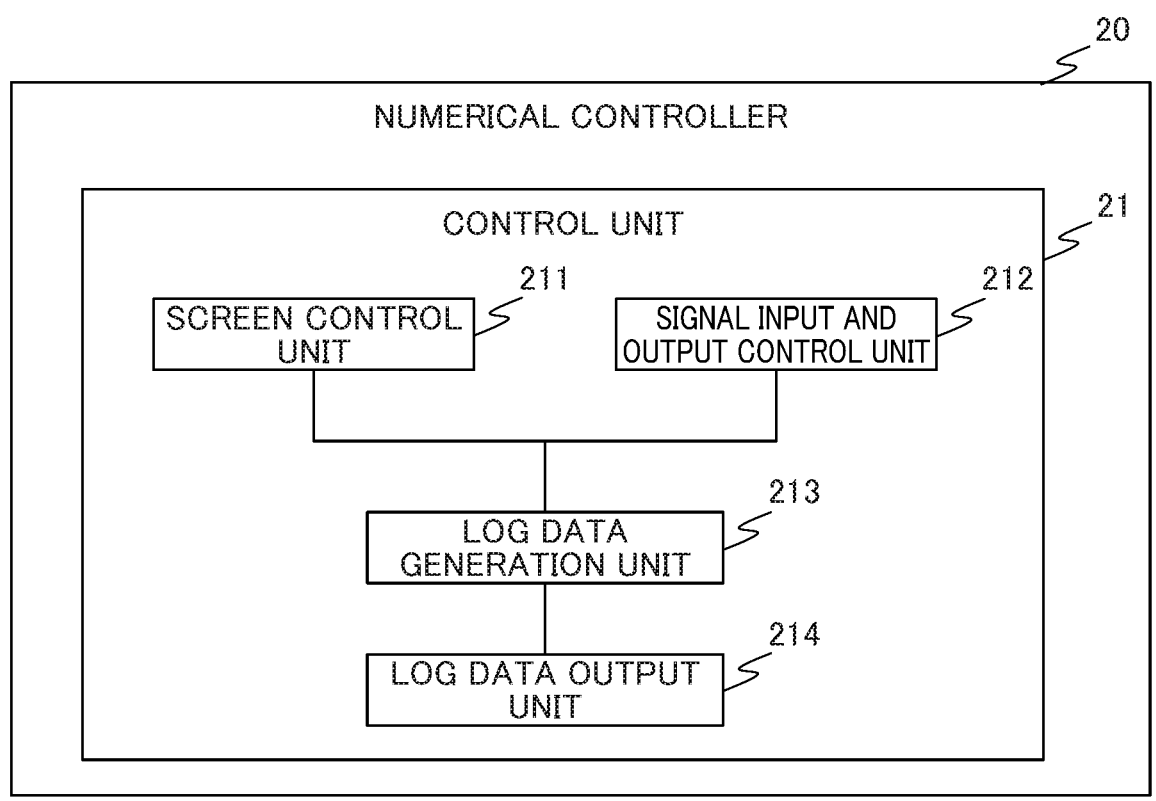
FIG. 3 is a functional block diagram of a numerical controller according to the embodiment.
Figure 4:
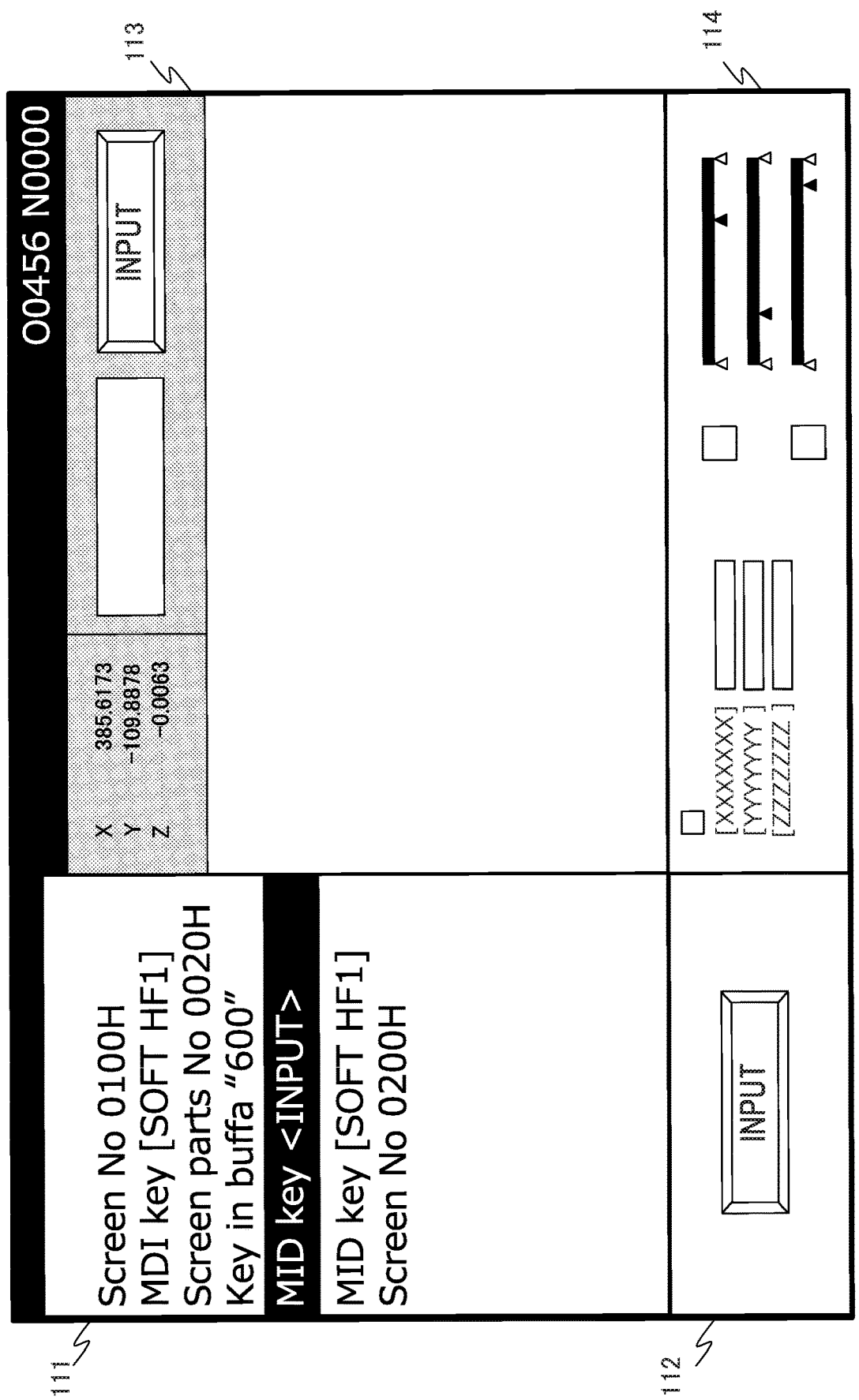
FIG. 4 shows an example constitution of an edit screen displayed in the screen creation system according to the embodiment.

Hereinafter, the first embodiment of the present invention will be explained based on the drawings. FIG. 1 is a block diagram showing the entire constitution of a screen creation system according to the embodiment. FIG. 2 is a block diagram showing details of a screen creation device according to the embodiment. FIG. 3 is a block diagram showing details of a numerical controller according to the embodiment. FIG. 4 shows an example constitution of an edit screen displayed in the screen creation system according to the embodiment.

<Constitution of Screen Creation System 1>

Firstly, the constitution of a screen creation system 1 according to the embodiment will be explained. As shown in FIG. 1, the screen creation system 1 includes a screen creation device 10, numerical controllers 20, machine tools 30, and a network 40. FIG. 1 shows N of the numerical controllers 20 and the machine tools 30, respectively, but the numbers of the numerical controllers 20 and the machine tools 30 may be one or more.

Herein, the numerical controllers 20 and the machine tools 30 are communicably connected with each other in a one-to-one pair. With respect to these pairs of the numerical controllers 20 and the machine tools 30, for example, a plurality of pairs of them may be installed in the same factory, or the respective pairs may be installed in different factories.

The screen creation device 10 and the numerical controller 20 are respectively connected to the network 40, and they can communicate with each other via the network 40. The network 40 is, for example, a local area network (LAN) built in a factory, the Internet, a public telephone network, or a combination thereof. There is no particular limitation on a specific communication method in the network 40, whether it is a wired connection or a radio connection, and the like. The screen creation device 10 and the numerical controller 20 may be directly connected via a connecting part instead of the communication using the network 40.

The screen creation device 10 creates a guidance screen by reading operation logs such as screen switching, a screen part operation, an MDI key operation, ON/OFF of input and output signals, a data change, and a soft key operation as logs of setup work and machining work, and arranging a pre-defined part related to each of the operations on the guidance screen being created. As shown in FIG. 2, the screen creation device 10 includes a display unit 11, a storage unit 12, and a control unit 13.

The display unit 11 is, for example, an image display device such as a display. The display unit 11 displays an edit screen for creating the guidance screen.

The storage unit 12 is, for example, a rewritable memory such as an electrically erasable programmable read-only memory (EEPROM), or, for example, a rewritable disk such as a hard disk drive (HDD) or a solid state drive (SSD). The storage unit 12 stores predefined related parts and operation logs related to each of the operations to be arranged on the guidance screen.

The control unit 13 controls the entire screen creation device 10, and achieves various functions in the present embodiment by reading various programs from storage areas such as ROMs, RAMs, flash memories, or hard disks (HDDs) as appropriate and executing them. The control unit 13 may be a CPU. The control unit 13 includes an edit screen display unit 131, a log data display unit 132, a log data selection unit 133, a related parts display unit 134, and a related parts arrangement unit 135. In addition, the control unit 13 includes common functional blocks such as a functional block for controlling the entire screen creation device 10 and a functional block for performing communications. In this regard, however, since these common functional blocks are well-known to those skilled in the art, their illustration and description are omitted.

The edit screen display unit 131 displays an edit screen used for creating a guidance screen in the display unit 11 when creating the guidance screen in the screen creation device 10. As shown in FIG. 4, the edit screen includes a log data display area 111 for displaying a set of log data, a related parts display area 112 for displaying a related part or the like corresponding to each operation included in the log data, and a guidance screen display area 113 for displaying the guidance screen being created. In addition to these areas, the edit screen may include, for example, an attribute values setting area 114 for setting the attribute values of the related part. The related part includes a related screen part related to log data of an operation and a related soft key related to log data of an operation, and may be, for example, graphical user interfaces (GUIs) such as icons, buttons, radio buttons, toggle buttons, forms, or text boxes.

The log data display unit 132 displays, on the edit screen (log data display area 111), a set of log data of a series of operations related to work by the machine tool 30, which is input from the numerical controller 20. More particularly, when a user performs operations related to work by the machine tool 30 in accordance with the display of the display device of the numerical controller 20, a set of log data corresponding to the logs of the operations is input from the numerical controller 20 to the screen creation device 10. The log data display unit 132 displays the set of the log data on the edit screen (log data display area 111).

The log data selection unit 133 selects one or more log data from the set of the log data displayed on the edit screen (log data display area 111), in accordance with an instruction of the user, for example, using a GUI.

The related parts display unit 134 acquires a related part related to the operation related to the log data selected by the log data selection unit 133 from the storage unit 12, and displays the related part on the edit screen (related parts display area 112). More particularly, when the user selects one or more log data from the set of the log data displayed on the edit screen (log data display area 111), a related part used in an operation corresponding to the selected log data is acquired from the storage unit 12 and displayed on the edit screen (related parts display area 112).

The related parts arrangement unit 135 arranges the related part displayed on the edit screen (related parts display area 112) on the guidance screen being created on the edit screen (guidance screen display area 113) in accordance with an instruction of the user. More particularly, the user arranges the related part displayed on the edit screen (related parts display area 112) on the guidance screen being created displayed on the edit screen (guidance screen display area 113), for example, by dragging the related part with a mouse or moving the related part with a directional key.

The numerical controller 20 causes the machine tool 30 to perform predetermined behavior by controlling the machine tool 30. As shown in FIG. 3, the numerical controller 20 includes a control unit 21. In addition to the control unit 21, the numerical controller 20 includes common functional blocks for controlling the machine tool 30. Since these common functional blocks are well-known to those skilled in the art, illustration and description thereof are omitted.

The control unit 21 controls the entire numerical controller 20, and achieves various functions of the embodiment by reading various programs from storage areas such as ROMs, RAMs, flash memories, or hard disks (HDDs) as appropriate and executing them. The control unit 21 may be a CPU. The control unit 21 includes a screen control unit 211, a signal input and output control unit 212, a log data generation unit 213, and a log data output unit 214.

The screen control unit 211 controls the display of an operation screen related to work by the machine tool 30 in the display device of the numerical controller 20. Further, the screen control unit 211 outputs data related to the control content related to the screen display of the operation screen to the log data generation unit 213.

The signal input and output control unit 212 controls the input and output of signals associated with the operation of the user on the operation screen displayed on the display device. Further, the signal input and output control unit 212 outputs data related to the control content related to the input and output of the signals to the log data generation unit 213.

It should be noted that the screen control unit 211 and the signal input and output control unit 212 are merely examples, and the control unit 21 may include other functional blocks, and various operations by the user can be responded by including other functional blocks.

The log data generation unit 213 generates log data of a series of operations related to work by the machine tool 30 from the data related to the control content related to screen display of the operation screen input from the screen control unit 211 and the data related to the control content related to the input and output of signals input from the signal input and output control unit 212.

The log data output unit 214 outputs a set of the log data of the series of the operations generated by the log data generation unit 213 to the screen creation device 10.

The machine tool 30 performs a predetermined machining such as cutting on workpieces such as parts based on a behavior command output from the numerical controller 20. More particularly, the machine tool 30 includes a motor to be driven to machine the workpiece, a spindle and a feed axis attached to the motor, a jig, a tool, and the like responding to the spindle and axis. The machine tool 30 performs the predetermined machining by driving the motor based on the behavior command output from the numerical controller 20.

Herein, the predetermined machining is not particularly limited, and may be other machining such as grinding, polishing, rolling, or forging, other than cutting. The machine tool 30 may be, for example, a machining center, a lathe, or the like.

<Behavior of Constitution of Screen Creation System 1>

Next, the behavior of the screen creation system 1 according to the embodiment will be explained. FIG. 5 is a flowchart showing the behavior of the screen creation system 1.

In step S1, the recording of log data is started in the numerical controller 20. In step S2, when work by the machine tool 30 is executed by the operation of the user on the operation screen of the numerical controller 20, the numerical controller 20 (log data generation unit 213) generates the log data.

In step S3, the recording of the log data is completed in the numerical controller 20. In step S4, the numerical controller 20 (log data output unit 214) outputs a set of the log data to the screen creation device 10.

In step S5, when the creation of the guidance screen is started by the operation of the user, the screen creation device 10 (log data display unit 132) displays the set of the log data on the edit screen (log data display area 111).

In step S6, the screen creation device 10 (log data selection unit 133) selects log data according to an instruction of the user.

In step S7, the screen creation device 10 (related parts display unit 134) displays a related part related to an operation related to the selected log data on the edit screen (related parts display area 112).

In step S8, the screen creation device 10 (related parts arrangement unit 135) arranges the related part displayed on the edit screen (related parts display area 112) on the guidance screen being created on the edit screen (guidance screen display area 113) in accordance with an instruction of the user.

In step S9, when the screen creation device 10 completes the creation of the guidance screen by the operation of the user (S10: Yes), the behavior of the screen creation device 10 is completed. When the creation of the guidance screen is not completed (S10: NO), the processing proceeds to step S6.

Example

Next, an Example of the embodiment will be explained. FIG. 6A shows an example program folder screen. FIGS. 6B to 6H show examples of related parts included in the program folder screen in FIG. 6A.

The screen of screen ID: 0100H, which is the program folder screen, includes the forms of screen part IDs: 0001H to 0004H, the text box of screen part ID: 0005H, and the forms of screen part IDs: 0006H and 0007H.

Figure 7A:
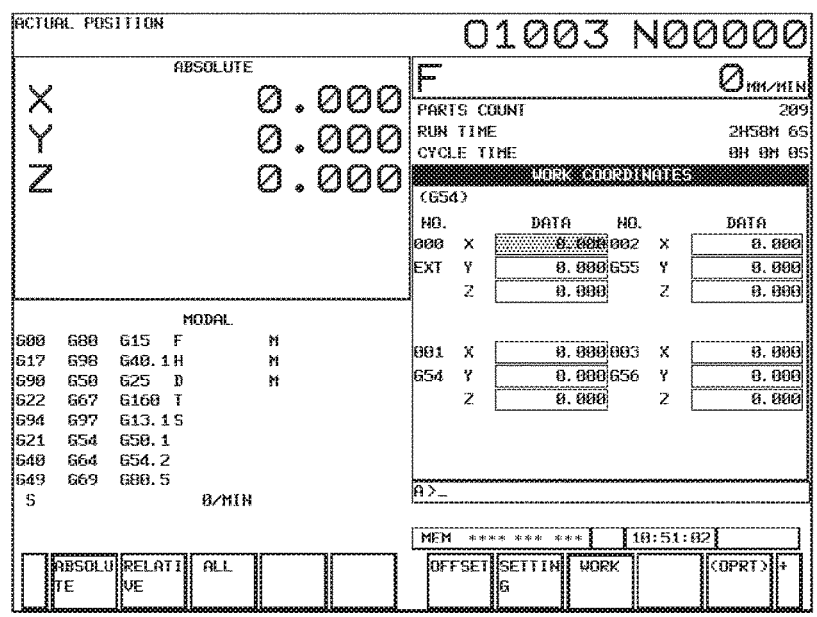
FIG. 7A shows an example workpiece offset screen in the Example.
Figure 7B:
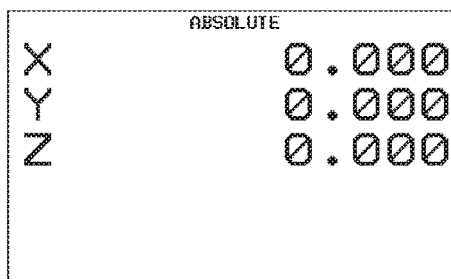
FIG. 7B shows an example related part included in the workpiece offset screen in the Example.
Figure 7C:
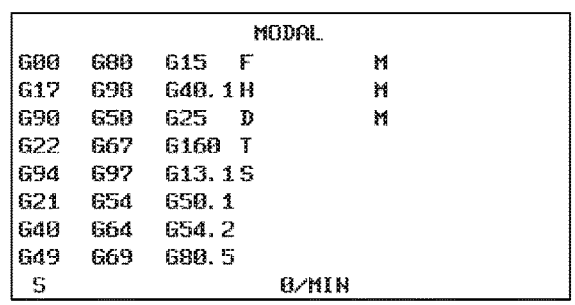
FIG. 7C shows an example related part included in the workpiece offset screen in the Example.

FIG. 7A shows an example workpiece offset screen. FIGS. 7B to 7I show examples of related parts included in the workpiece offset screen in FIG. 7A.

The screen of screen ID: 0200H, which is the workpiece offset screen, includes the forms of screen part IDs: 0008H and 0009H, the forms of screen part IDs: 000AH to 000CH, the text box of screen part ID: 0005H, and the forms of screen part IDs: 0006H and 0007H.

Figure 8A:
FIG. 8A shows an example soft key in the Example.
Figure 8B:
FIG. 8B shows an example soft key in the Example.

FIGS. 8A and 8B show examples of soft keys. FIG. 8A shows the soft key of soft key ID: 0030H. FIG. 8B shows the soft key of soft key ID: 0040H.

The user performs operations related to work by the machine tool 30 on the operation screen displayed on the display device of the numerical controller 20. The set of log data of the operations is output to the screen creation device 10, and the related parts of FIGS. 6B to 6H, 7B to 7I, and 8A and 8B corresponding to the IDs included in the log data are sequentially displayed on the edit screen (related part display area 112) of the screen creation device 10. These related parts are arranged on the guidance screen being created on the edit screen of the screen creation device 10 (guidance screen display area 113), in accordance with an instruction of the user.

FIG. 9 shows an example log data. Screen No. 0100H on the first line indicates that the program folder screen of ID: 0100H was displayed.

Key in buffa "O0001" on the second line indicates that the ID of the measurement program O0001 was input in the text box.

Soft key No. 0030H on the third line indicates that the soft key of ID: 0030H was pressed. As a result, the measurement program O0001 would be searched.

Soft key No. 0040H on the fourth line indicates that the soft key of ID: 0040H was pressed. As a result, the measurement program O0001 would be selected.

G0007.2 ON and G0007.2 OFF on the fifth and sixth lines indicate that the automatic operation of the measurement program O0001 was activated.

Screen No. 0200H on the seventh line indicates that the workpiece offset screen of ID: 0200H was displayed.

Screen No. 0100H on the eighth line indicates that the program folder screen of ID: 0100H was displayed.

Key in buffa "O0002" on the ninth line indicates that the ID of the measurement program O0002 was input in the text box.

Soft key No. 0030H on the tenth line indicates that the soft key of ID: 0030H was pressed. As a result, the measurement program O0002 would be searched.

Soft key No. 0040H on the eleventh line indicates that the soft key of ID: 0040H was pressed. As a result, the measurement program O0002 would be selected.

G0007.2 ON and G0007.2 OFF on the twelfth and thirteenth lines indicate that the automatic operation of the measurement program O0002 was activated.

Screen No. 0200H on the fourteenth line indicates that the workpiece offset screen of ID: 0200H was displayed.

When a guidance screen is created with the screen creation device 10, a related part corresponding to an ID or the like included in each line of the log data selected in accordance with instructions of the user from the set of the log data is displayed on the edit screen (related parts display area 112). The user arranges these related parts on the guidance screen being created on the edit screen (guidance screen display area 113).

Figure 10:
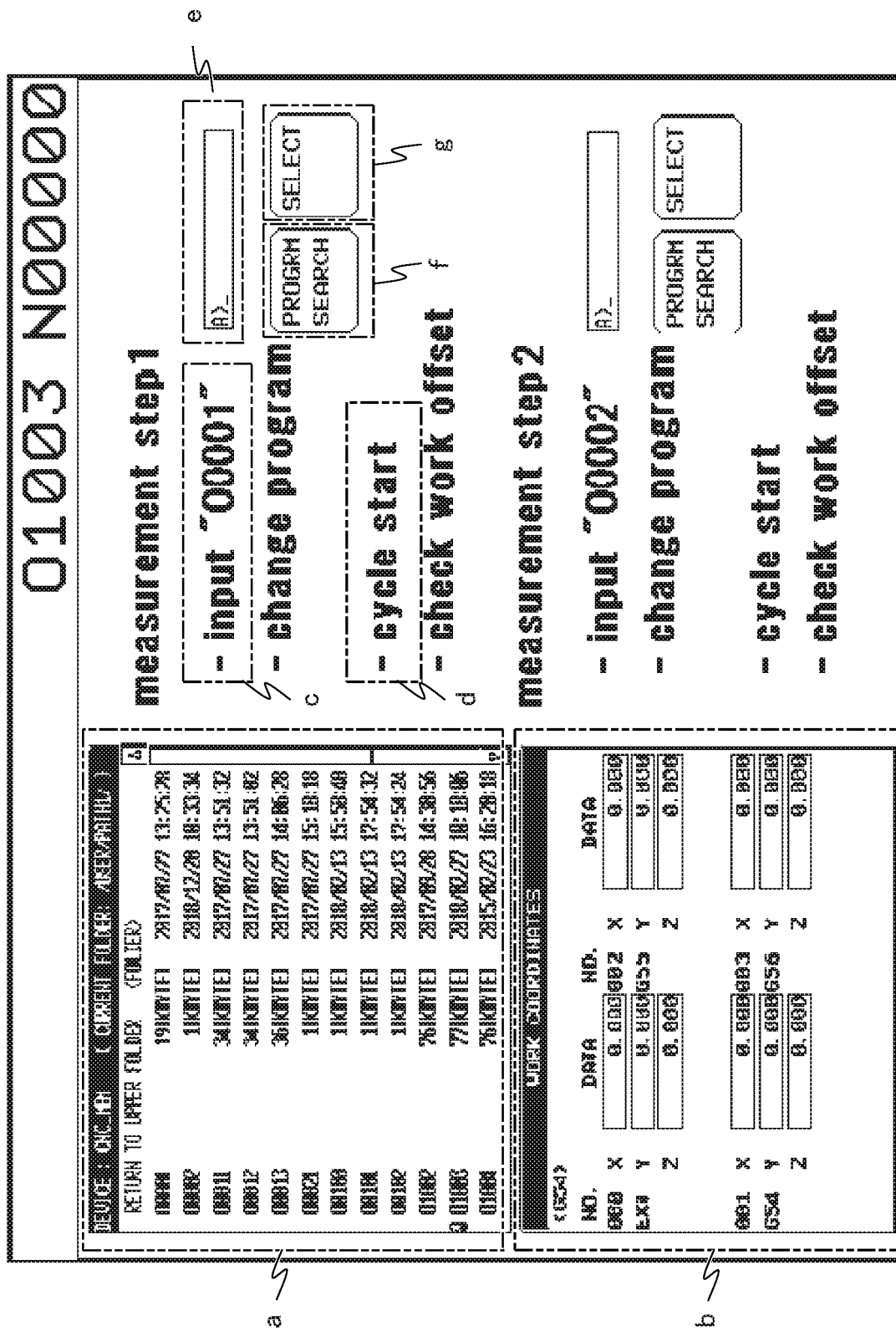
FIG. 10 is an example guidance screen created in the Example.

FIG. 10 shows an example guidance screen created based on the log data in FIG. 9. In the guidance screen in FIG. 10, in section a, the form of ID: 0004H, which is an element of the program folder screen of ID: 0100H included in the set of the log data, is inserted. In section b, the form of ID: 000CH, which is an element of the workpiece offset screen of ID: 0200H included in the set of the log data, is inserted. In section c, the character string of input "O0001" is inserted based on the log data "Key in buffa "O0001"". In section d, a character string of, for example, "cycle start" is inserted based on the log data "G0007.2 ON" and "G0007.2 OFF". In section e, the form of ID: 0005H, which is an element of the program folder screen of ID: 0100H included in the set of the log data, is displayed. In section f, the soft key of ID: 0040H is inserted based on the log data "Soft key No. 0040H". In section g, the soft key of ID: 0030H is inserted based on the log data "Soft key No. 0030H".

Effects of the First Embodiment

The screen creation device according to the first embodiment is the screen creation device 10 that creates a guidance screen for an operation related to work by the machine tool to be displayed on the display device of the numerical controller 20, and includes the display unit 11, the storage unit 12, and the control unit 13. The storage unit 12 stores a predefined related part related to the operation to be arranged on the guidance screen. The control unit 13 includes the edit screen display unit 131 that displays an edit screen including the log data display area 111, the related parts display area 112, and the guidance screen display area 113 in the display unit 11; the log data display unit 132 that displays a set of log data of a series of operations related to work by the machine tool 30 to be input from the numerical controller 20 in the log data display area 111; the log data selection unit 133 that selects log data from the set of the log data displayed in the log data display area 111 in accordance with an instruction of a user; the related parts display unit 134 that acquires a related part related to an operation related to the selected log data from the storage unit 12 and displays the related part in the related parts display area 112; and the related parts arrangement unit 135 that arranges the related part displayed in the related parts display area 112 on the guidance screen being created in the guidance screen display area 113 in accordance with an instruction of the user.

This enables guidance screens for setup work and machining work using a machine tool to be created with simple processing.

The related part includes related screen parts related to log data of operations and related soft keys related to log data of operations.

Thus, it is possible to arrange screen parts and soft keys to be used when operating the machine tool 30 from the numerical controller 20 on the guidance screen being created.

The screen creation system according to the first embodiment includes the screen creation device 10 and one or more numerical controllers 20. The numerical controller 20 includes the log data generation unit 213 that generates the log data of an operation related to work by the machine tool 30, and the log data output unit 214 that outputs a set of the log data of a series of operations related to work by the machine tool 30 generated by the log data generation unit 213 to the screen creation device 10.

This enables guidance screens for setup work and machining work using a machine tool to be created with simple processing.

Other Embodiments

Although the above-described embodiment is a preferred embodiment of the present invention, the scope of the present invention is not limited to the embodiment, and various modifications can be made without departing from the gist of the present invention.

[Modification 1]

Figure 11:
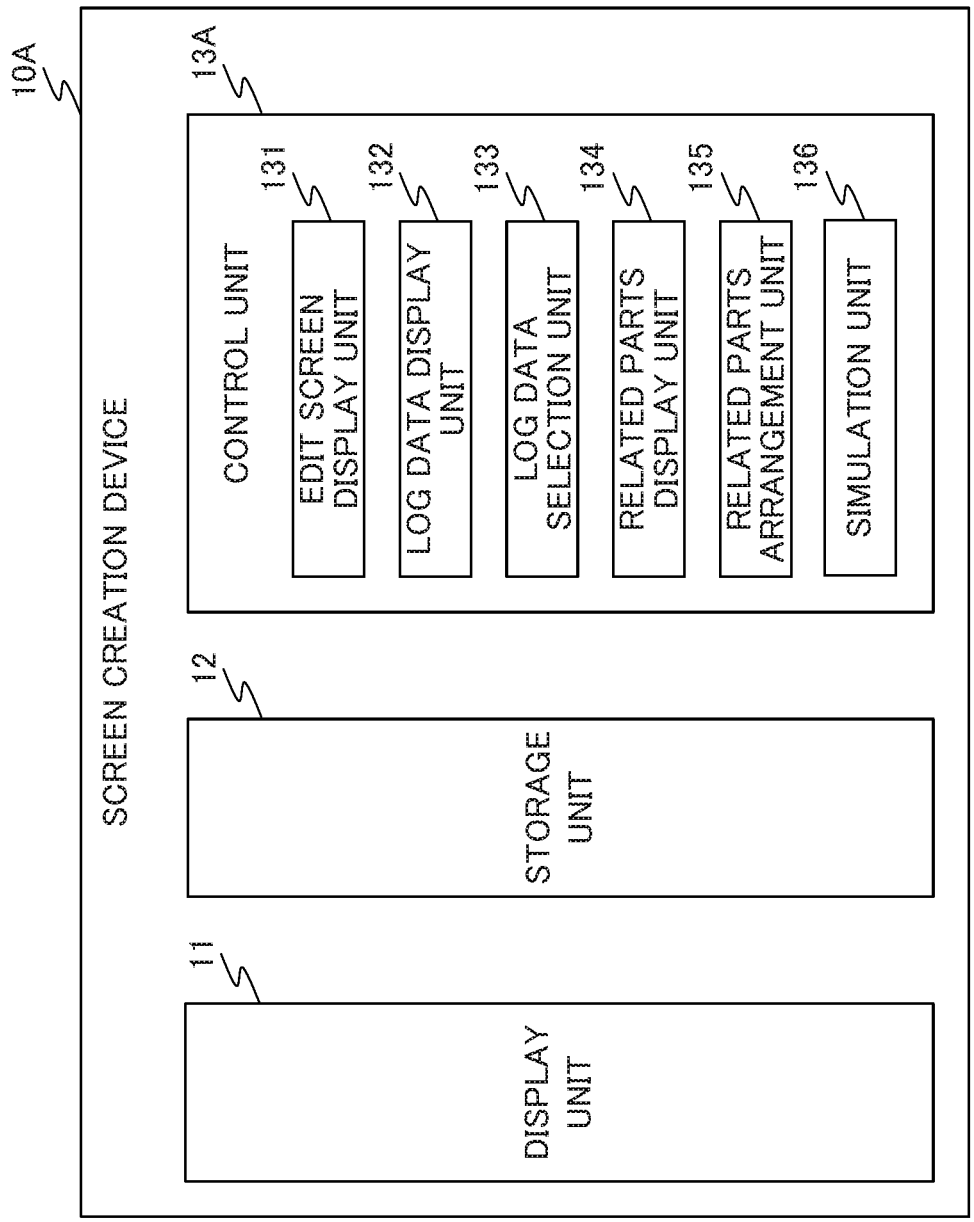
FIG. 11 is a functional block diagram of a screen creation device according to a modification.

FIG. 11 is a functional block diagram of a screen creation device 10A according to Modification 1. Modification 1 includes a control unit 13A instead of the control unit 13 of the screen creation device 10 according to the above embodiment. The control unit 13A further includes a simulation unit 136 in addition to the functional blocks of the control unit 13.

The simulation unit 136 graphically reproduces as a simulator the procedure of operations corresponding to a set of log data that was input from the numerical controller 20 on the display unit 11 based on the set of the log data. In this instance, the related parts display unit 134 acquires a related part related to the operation from the storage unit 12 during the reproduction, and displays the related part on the edit screen (related parts display area 112). This allows the user to arrange the related part related to the operation on the guidance screen being created while visually checking the reproduction of the procedure of the operations on the simulator.

[Modification 2]

As Modification 2, the storage unit 12 may store a preset guidance screen template. In this instance, the related parts arrangement unit 135 arranges related parts on the guidance screen being created according to the template. For example, the related parts arrangement unit 135 may arrange the related parts from the upper left in the order of the operation logs in accordance with the layout of the template. As a result, the user does not need to manually arrange the related parts on the guidance screen being created, and it is possible to automatically arrange the related parts.

[Modification 3]

Figure 12:
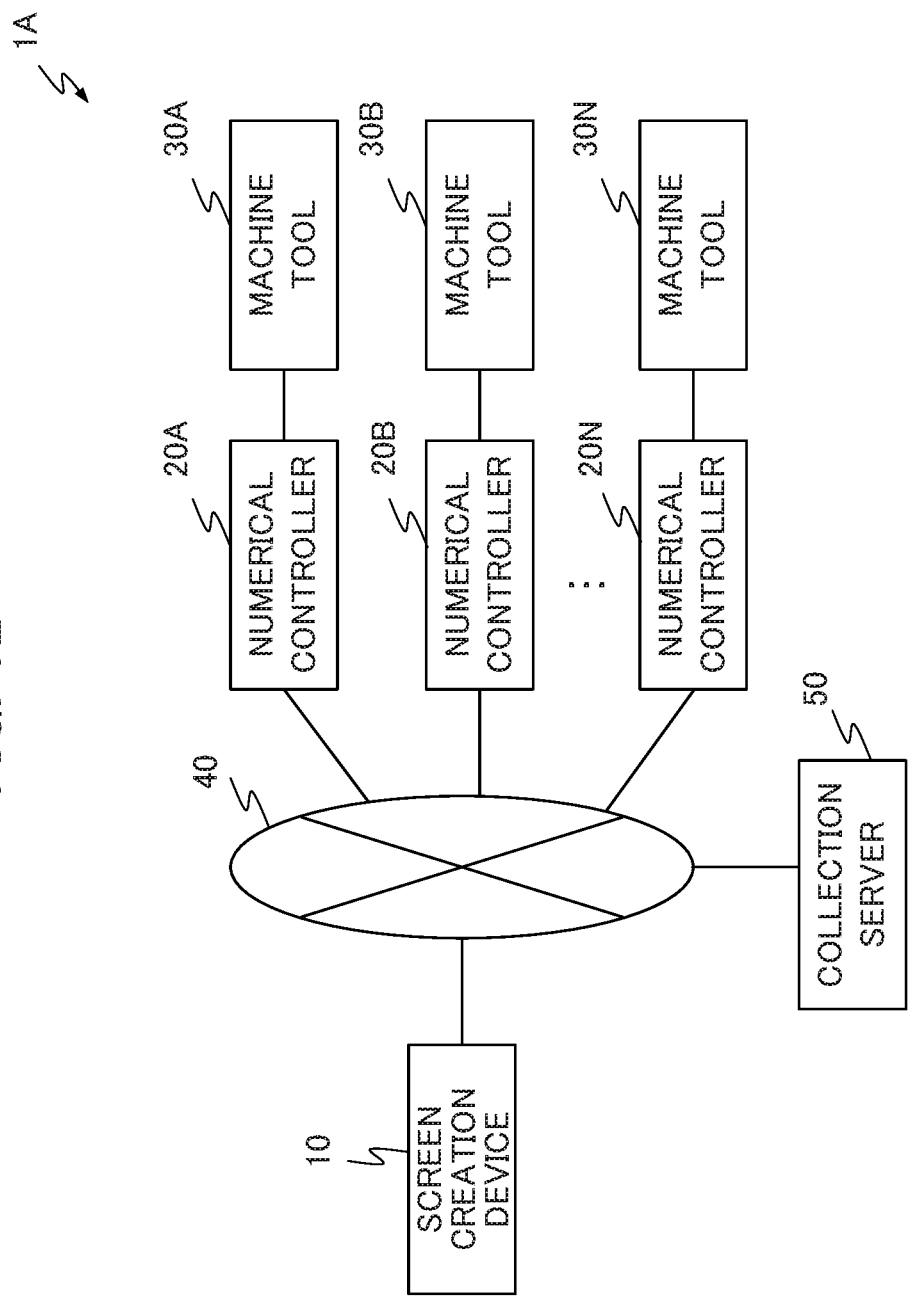
FIG. 12 is a functional block diagram of a screen creation system according to a modification.

FIG. 12 shows the entire constitution of a screen creation system 1A according to Modification 3. Modification 3 includes a collection server 50 on the network 40 in addition to the components of the screen creation system 1 according to the above embodiment.

In the numerical controller 20 included in the screen creation system 1A, the log data output unit 214 outputs a set of log data of a series of operations related to work by the machine tool 30 generated by the log data generation unit 213 to the collection server 50.

The collection server 50 outputs a set of log data corresponding to a designated numerical controller 20 from a set of log data of a series of operations related to work by the machine tool 30 input from each of the numerical controller 20 to the screen creation device 10.

As a result, the screen creation system 1A can respond to more numerical controllers 20 and thus more log data.

[Modification 4]

The screen creation device 10 or 10A may be included in the numerical controller 20 to be integrated with each other.

This enables guidance screens for setup work and machining work using a machine tool to be created with simple processing in the numerical controller 20 that operates each of the machine tools 30.

[Modification 5]

In the above-described embodiment, the machine tool 30 is controlled using the numerical controller 20, but the present invention is not limited thereto. For example, the screen creation system may include a robot controller that controls a robot instead of the numerical controller 20 that controls the machine tool 30.

This enables a guidance screen for work using the robot to be created in the controller that operates the robot with simple processing.

EXPLANATION OF REFERENCE NUMERALS

1, 1A SCREEN CREATION SYSTEM
10, 10A SCREEN CREATION DEVICE
11 DISPLAY UNIT
12 STORAGE UNIT
13, 13A CONTROL UNIT
20, 20A, 20B, 20N NUMERICAL CONTROLLER
30, 30A, 30B, 30N MACHINE TOOL
40 NETWORK
50 COLLECTION SERVER
131 EDIT SCREEN DISPLAY UNIT
132 LOG DATA DISPLAY UNIT
133 LOG DATA SELECTION UNIT
134 RELATED PARTS DISPLAY UNIT
135 RELATED PARTS ARRANGEMENT UNIT
136 SIMULATION UNIT

What is claimed is:

1. A screen creation device that creates a guidance screen according to a procedure for an operation by an operator related to work including setup work and/or machining work by a machine tool, the guidance screen being configured to be displayed on a display device of a numerical controller, the screen creation device comprising:
a display unit; a storage unit; and a control unit,
wherein the storage unit stores a predefined related part related to the operation including any one of screen switching, a screen part operation, an MDI key operation, ON/OFF of input and output signals, a data change, and a soft key operation, which are related to the operation by the operator related to the work including setup work and/or machining work to be arranged on the guidance screen, and
wherein the control unit comprises:
a memory configured to store a program; and
a processor configured to execute the program and control the screen creation device to:
display an edit screen including a log data display area, a related parts display area, and a guidance screen display area in the display unit;
display a set of log data of an operation including any one of screen switching, a screen part operation, an MDI key operation, ON/OFF of input and output signals, a data change, and a soft key operation, of a series of operations related to work performed in the past by the operator, related to the work including setup work and/or machining work by the machine tool to be input from the numerical controller in the log data display area;
select log data from the set of the log data displayed in the log data display area in accordance with an instruction of a user;
acquire the related part related to the operation related to the selected log data from the storage unit and display the related part in the related parts display area; and
arrange the related part displayed in the related parts display area on the guidance screen being created in the guidance screen display area in accordance with an instruction of the user, according to the procedure for the operation by the operator related to the work including setup work and/or machining work.

2. The screen creation device according to claim 1, wherein the related part includes a related screen part related to the log data of the operation and a related soft key related to the log data of the operation.

3. The screen creation device according to claim 1, the processor is further configured to execute the program and control the screen creation device to reproduce a procedure of the operations on the display unit based on the input set of the log data,
to acquire the related part related to the operation from the storage unit during the reproduction of the procedure of the operations and to display the related part on the related parts display area.

4. The screen creation device according to claim 1, wherein the storage unit stores a preset template of the guidance screen, and wherein the processor is further configured to execute the program and control the screen creation device to arrange the related part displayed in the related parts display area on the guidance screen being created in the guidance screen display area according to the template.

5. A screen creation system, comprising:
the screen creation device according to claim 1; and
one or more of the numerical controller,
wherein the numerical controller comprises:
a log data generation unit that generates the log data of the operation related to the work by the machine tool; and
a log data output unit that outputs the set of the log data of the series of the operations related to the work by the machine tool generated by the log data generation unit to the screen creation device.

6. A screen creation system, comprising:
the screen creation device according to claim 1;
one or more of the numerical controller; and
a collection server,
wherein the numerical controller comprises:
a log data generation unit that generates the log data related to the work by the machine tool; and
a first log data output unit that outputs the set of the log data of the series of the operations related to the work by the machine tool generated by the log data generation unit to the collection server, and
wherein the collection server comprises
a second log data output unit that outputs a set of the log data corresponding to a designated numerical controller from the set of the log data of the series of the operations related to the work by the machine tool that is input from each of the numerical controller to the screen creation device.

7. The screen creation device according to claim 1, wherein the screen creation device is included in the numerical controller.

* * * * *